United States Patent
Yasue (10) Patent No.: US 6,806,871 B1
(45) Date of Patent: Oct. 19, 2004

(54) DRIVER IC, ELECTRO-OPTICAL DEVICE AND ELECTRONIC EQUIPMENT

(75) Inventor: Tadashi Yasue, Suwa (JP)

(73) Assignee: Seiko Epson Corporation, Tokyo (JP)

(*) Notice: Subject to any disclaimer, the term of this patent is extended or adjusted under 35 U.S.C. 154(b) by 290 days.

(21) Appl. No.: 09/703,841

(22) Filed: Nov. 2, 2000

(30) Foreign Application Priority Data

Nov. 5, 1999 (JP) .......................................... 11-315062

(51) Int. Cl.$^7$ ................................................ G09G 5/00
(52) U.S. Cl. .......................... 345/211; 345/94; 345/99; 345/100; 345/101; 345/210; 345/214; 359/242; 359/245; 359/267; 315/295; 315/297; 257/7; 349/33; 349/34; 349/149; 349/152; 331/175; 331/176
(58) Field of Search ................................ 345/211, 214, 345/210, 94, 95, 101, 99, 100; 359/242, 245, 267; 315/297, 295; 324/416; 257/7; 349/33, 149, 31, 152; 331/175, 176; 310/314, 315; 372/9, 12

(56) References Cited

U.S. PATENT DOCUMENTS

| 4,570,115 | A | | 2/1986 | Misawa et al. |
| 5,144,366 | A | * | 9/1992 | Sakamoto et al. ........... 355/208 |
| 5,168,483 | A | * | 12/1992 | Oka et al. .................. 369/13.2 |
| 5,406,400 | A | * | 4/1995 | Matsuda ....................... 349/72 |
| 5,742,009 | A | | 4/1998 | Hamzehdoost et al. |
| 5,784,073 | A | * | 7/1998 | Yamazaki et al. .......... 345/511 |
| 5,999,063 | A | * | 12/1999 | Sakurai et al. .............. 331/158 |
| 6,067,062 | A | * | 5/2000 | Takasu et al. ................. 345/87 |
| 6,117,752 | A | * | 9/2000 | Suzuki ....................... 438/487 |
| 6,166,491 | A | * | 12/2000 | Tsuchiya et al. ......... 315/169.3 |
| 6,236,385 | B1 | * | 5/2001 | Nomura et al. ............... 345/95 |
| 6,337,731 | B1 | * | 1/2002 | Takemura ................... 349/187 |
| 6,362,803 | B1 | * | 3/2002 | Tomomura et al. ........... 345/94 |
| 6,411,576 | B1 | * | 6/2002 | Furukawa et al. ........ 369/53.19 |
| 6,449,575 | B2 | * | 9/2002 | Bausch et al. .............. 702/107 |
| 6,452,581 | B1 | * | 9/2002 | Katakura et al. ........... 345/101 |
| 6,483,497 | B1 | * | 11/2002 | Iino et al. ................... 345/100 |
| 6,635,161 | B2 | * | 10/2003 | Inagaki ....................... 204/425 |

FOREIGN PATENT DOCUMENTS

| EP | 0 786 755 A2 | 7/1997 |
| JP | 62215241 | 9/1987 |
| JP | 08234175 | 9/1996 |
| JP | 11 218731 A | 8/1999 |
| WO | WO 98/40872 | 9/1998 |

* cited by examiner

Primary Examiner—Xiao Wu
Assistant Examiner—Abbas Abdulselam
(74) Attorney, Agent, or Firm—Oliff & Berridge, PLC (57) ABSTRACT

A liquid crystal driver IC comprising: a power circuit; an electric volume for varying an output voltage from the power circuit; a temperature detector; and a correction table for storing an electric volume control value corresponding to a temperature detected by the temperature detector. The power circuit includes: a first power circuit having a first temperature-voltage characteristic; a second power circuit having a second temperature-voltage characteristic; and a temperature gradient selection circuit for outputting a voltage conforming with a desired temperature gradient characteristic based on output voltages from the first and second power circuits. The temperature detector detects an actual temperature based on the first and second temperature-voltage characteristics. The output voltages from the first and second power circuits are adjusted at the electric volume according to the electric volume control value in the correction table and are output, when the electrical volume control value corresponds to an actual temperature detected by the temperature detector.

24 Claims, 10 Drawing Sheets

PRIOR ART

DRIVER IC, ELECTRO-OPTICAL DEVICE AND ELECTRONIC EQUIPMENT

BACKGROUND OF THE INVENTION

1. Field of the Invention

The present invention relates to a driver IC for driving an electro-optical element such as liquid crystal or the like, an electro-optical device and electronic equipment, and particularly to an improvement of temperature compensation necessary to drive an electro-optical element.

2. Description of Related Art

For example, taking liquid crystal as an example of the electro-optical element, the liquid crystal has temperature-dependence, and the optical transmissivity of the liquid crystal is varied even under application of the same voltage if the environmental temperature is varied. Therefore, various temperature compensation countermeasures have been hitherto taken. One of these countermeasures is to linearly interpolate the voltage to be applied to the liquid crystal, thereby performing the temperature compensation. As a method of implementing this countermeasure, the linear interpolation is executed by selecting any one of two or more temperature gradients or combining these temperature gradients.

In this linear interpolating method, since the temperature gradient is constant over the overall region from a low temperature area to a high temperature area, it is not necessarily coincident with the temperature dependence of the actual liquid crystal, and it is impossible to perform the temperature compensation with high precision.

Although the temperature dependence of the liquid crystal has an influence on not only the applied voltage-transmissivity characteristic but also on other parameters, no temperature compensation is carried out on these other parameters.

Furthermore, a temperature sensor for detecting the environmental temperature is indispensable to perform this kind of temperature compensation. Since the temperature sensor aims to detect the temperature for the temperature compensation of liquid crystal, it should be originally used to detect the temperature of the liquid crystal itself, however, it is actually impossible to detect the temperature of the liquid crystal.

Therefore, the temperature sensor must be provided outside a display panel, and a physical distance occurs between the liquid crystal and the temperature sensor. The physical distance is increased as the size of the liquid crystal panel is increased, and thus the temperature sensor detects the temperature at some place which is different in temperature from the temperature of the liquid crystal.

SUMMARY OF THE INVENTION

An objective of the present invention is to provide a driver IC, an electro-optical device and electronic equipment which can perform more accurate temperature compensation in conformity with the temperature dependence of an electro-optical element.

Another objective of the present invention is to provide an electro-optical device and electronic equipment in which a temperature sensor is installed in a driver IC to perform temperature detection having a less difference from the temperature of liquid crystal, thereby performing more accurate temperature compensation.

According to a first aspect of the present invention, there is provided a driver IC for driving an electro-optical element comprising: a power circuit for outputting a voltage in accordance with the temperature-voltage characteristics; an electrical volume for varying an output voltage from the power circuit; a temperature detector for detecting an environmental temperature; and a correction table for storing an electrical volume control value corresponding to a temperature detected by the temperature detector. The power circuit comprises: a first power circuit having a first temperature-voltage characteristic; a second power circuit having a second temperature-voltage characteristic; and a temperature gradient selection circuit for outputting a voltage conforming with a desired temperature gradient characteristic based on output voltages from the first and second power circuits. The temperature detector detects an actual temperature based on the first and second temperature-voltage characteristics, and adjusts the output voltages from the first and second power circuits at the electrical volume according to the electrical volume control value in the correction table and outputs the adjusted voltages, the electrical volume control value corresponding to an actual temperature detected by the temperature detector. This aspect of the invention makes it possible to provide a low temperature area, a room-temperature area, and a high temperature area with different temperature gradients, to implement applied voltage compensation conforming with the temperature dependence of an electro-optical element, such as curved line interpolation other than the linear interpolation, for example.

According to a second aspect of the present invention, there is provided a driver IC for driving an electro-optical element comprising: an oscillator for outputting an oscillation frequency which is variable by an electrical volume; a temperature detector for detecting an environmental temperature; and a correction table for storing an electric volume control value corresponding to a temperature detected by the temperature detector. The oscillation frequency of the oscillator is variable by adjusting the electrical volume based on the electrical volume control value in the correction table which corresponds to an actual temperature detected by the temperature detector. This makes it possible to change a frame frequency according to temperature, so that a frame frequency following the characteristic of an electro-optical element wherein the reaction speed depends on temperature can be set.

According to third aspect of the present invention, there is provided a driver IC for driving an electro-optical element comprising: an oscillator; a gray scale clock generator for generating a gray scale clock based on an oscillation frequency of the oscillator; a gray scale pulse generator for generating a plurality of gray scale pulses each having a pulse width which depends on a gray level value, based on the gray scale clock from the gray scale clock generator; a temperature detector for detecting an environmental temperature; and a correction table for storing a correction value for a gray scale pulse width which corresponds to a temperature detected by the temperature detector. The gray scale pulse generator is capable of varying pulse widths of a plurality of gray scale pulses based on a correction value for a gray scale pulse width in the correction table which corresponds to an actual temperature detected by the temperature detector. This makes it possible to prevent the deterioration of gray levels due to temperature by changing the pulse width of gray scale pulses depending on temperature, even when there is a temperature dependence characteristic wherein gray level values are different from each other when the same voltage is applied to the electro-optical element at a room temperature and a lower temperature.

According to a fourth aspect of the present invention, there is provided an electro-optical device comprising: a panel having an electro-optical element between a first substrate and a second substrate; and a driver IC which is mounted on the first substrate and drives the electro-optical element. The driver IC comprises: a temperature detector for detecting an environmental temperature; and a temperature compensation circuit for performing temperature compensation necessary for driving the electro-optical element, based on an actual temperature detected by the temperature detector. First and second electrodes are respectively formed on the first and second substrates to face the electro-optical element. At least one of the first and second electrodes is connected to a terminal of the driver IC mounted on the first substrate and has a redundant portion which extends from a position of the terminal to a back surface of the driver IC. This aspect of the invention makes it possible to detect a temperature having only a slight difference from the temperature of liquid crystal by the temperature detector in the driver IC, since the temperature of the electro-optical is transmitted through the electrode and the redundant portion thereof to the back surface of the driver IC. Therefore, the precision of the temperature compensation can be enhanced.

DETAILED DESCRIPTION OF THE PREFERRED EMBODIMENT

Preferred embodiments of the present invention will be described with reference to the accompanying drawings while the present invention is applied to a liquid crystal device which is an embodiment of an electro-optical device.

Description on Liquid Crystal Device

Figure 1:
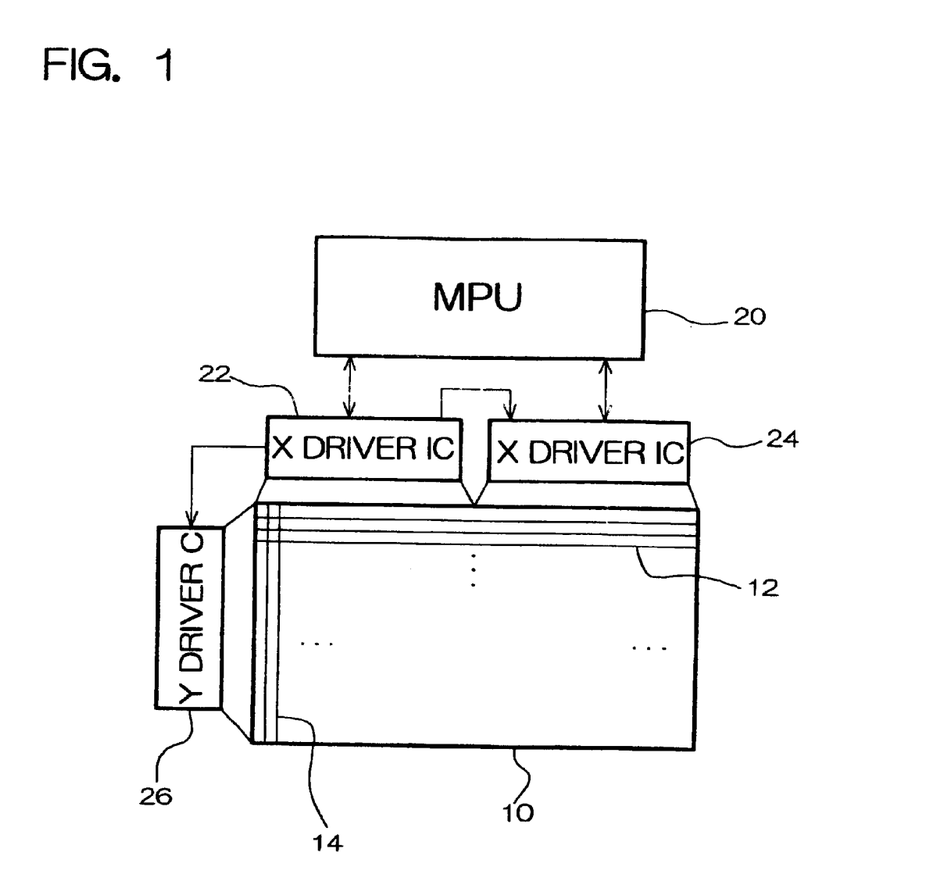
FIG. 1 is a diagram showing a liquid crystal device to which the present invention is applied.

FIG. 1 is a diagram showing a simple matrix type liquid crystal device.

A liquid crystal panel 10 is a simple matrix type liquid crystal device, for example, and it is formed by hermetically filling liquid crystal into the gap between a first substrate (not shown) having first electrodes (segment electrodes) 12 formed thereon and a second substrate (not shown) having second electrodes (common electrodes) 14 formed thereon.

MPU 20 serves to control electronic equipment such as a cellular phone or the like in which the liquid crystal device is installed. Two X driver ICs 22, 24 are provided as driver ICs to which command data, display data, address data, etc. are supplied from the MPU 20. The X driver IC 22 functions as a master while the X driver IC 24 functions as a slave. The X driver ICs 22, 24 supply data signals (gray scale signals) to the second electrodes 14 formed in the liquid crystal panel 10, and they are designed to have the same IC structure. Only the X driver IC 22 serving as the master generates display control signals such as latch pulse (LP), gray scale control pulse (GCP), etc. on the basis of the signal from MPU 20, and these display control signals are input from the X driver IC 22 serving as the master to the X driver IC 24 serving as the slave.

A Y driver IC 26 drives the first electrodes 12 of the liquid crystal panel 10. The Y driver IC 26 is supplied with some of the display control signals from the X driver IC 22 serving as the master.

The X driver ICs 22, 24 and the Y driver IC 26 drive the liquid crystal panel 10 in an MLS (Multi-Line Selection) mode. For example, the data signals are supplied to the second electrodes 14 while selecting four second electrodes 14 at the same time within one horizontal scan period, and the same first electrode 12 is selected at plural times within one vertical period.

The liquid crystal panel 10 to which the present invention is applied is not necessarily limited to the simple matrix type liquid crystal panel driven in the MLS mode, and it may be applied to an active matrix type liquid crystal panel which is driven while selecting one first electrode 12 like normal cases, or uses MIS (Metal-Insulator-Silicon), a two-terminal element such as MIM (Metal-Insulator-Metal) or the like, a three-terminal element such as TFT (Thin Film Transistor).

Brief Description of Driver IC

Figure 2:
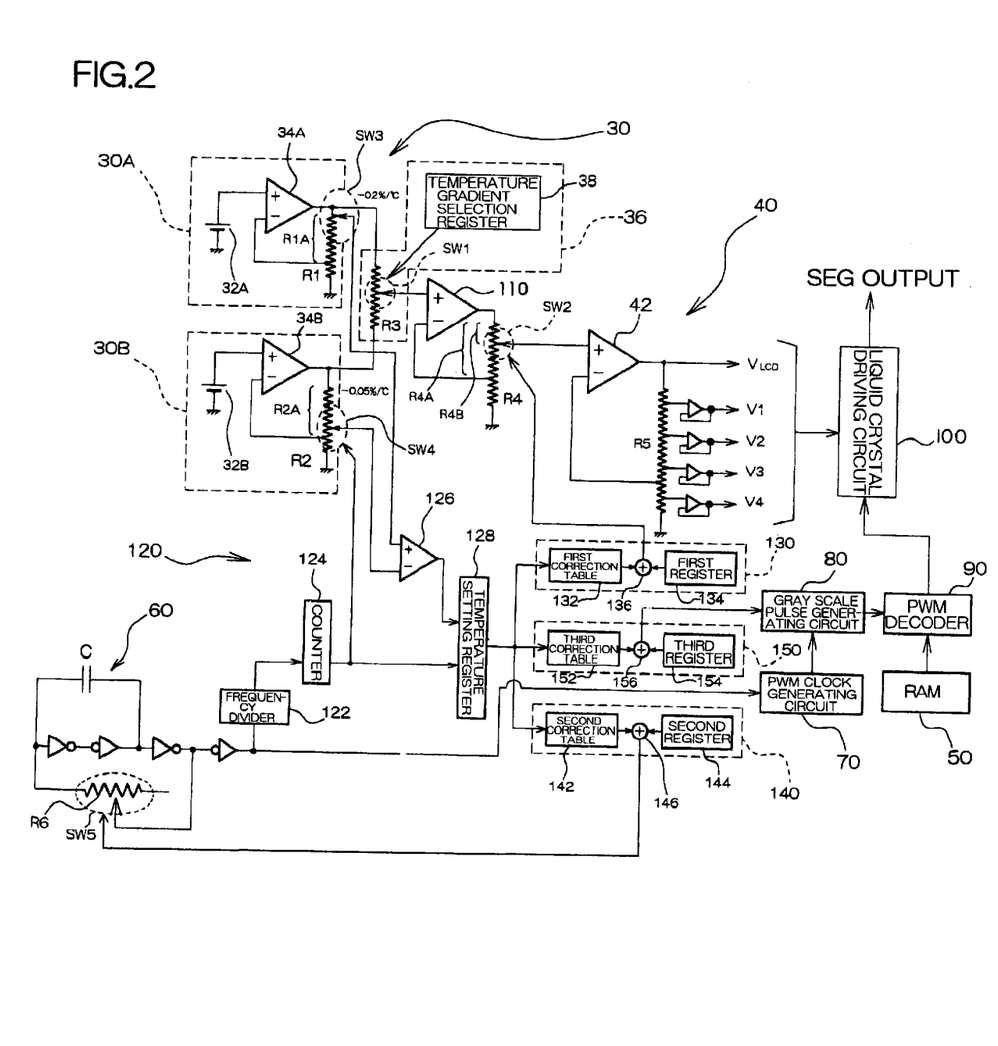
FIG. 2 is a block diagram showing an X driver IC shown in FIG. 1.

FIG. 2 is a block diagram showing the main part of the X driver IC 22 shown in FIG. 1. In FIG. 2, the following functional blocks are provided as main functional blocks contained in the X driver IC 22. A power circuit 30 generates a reference voltage required to drive liquid crystal. A voltage generating circuit 40 generates voltages $V_{LCD}$, V1 to V4 required to drive the liquid crystal on the basis of the output from the power circuit 30. The display data (gray scale data) supplied from MPU 20 are stored in a storage unit, for example, RAM 50. An oscillation circuit 60 oscillates and outputs a reference frequency, and a PWM clock generating circuit 70 for generating PWM (Pulse Width Modulation) clocks on the basis of the oscillation frequency from the oscillation circuit 60 is provided. A gray scale pulse generating circuit 80 generates gray scale pulses for a plurality of gray scales, for example, 32 gray scales corresponding to the respective gray level values on the basis of the PWM clocks.

On the basis of the gray scale data from RAM 50, a PWM decoder 90 selects the corresponding gray scale pulse and outputs the gray scale pulses thus selected every line. A liquid crystal driving circuit 100 the wave height of the gray scale pulse from the PWM decoder 90 is shifted to the various kinds of voltage values $V_{LCD}$, V1 to V4 from the voltage generating circuit 40 or the ground voltage $V_{GND}$ and supplies it to the corresponding second electrode 14 shown in FIG. 1.

Figure 3:
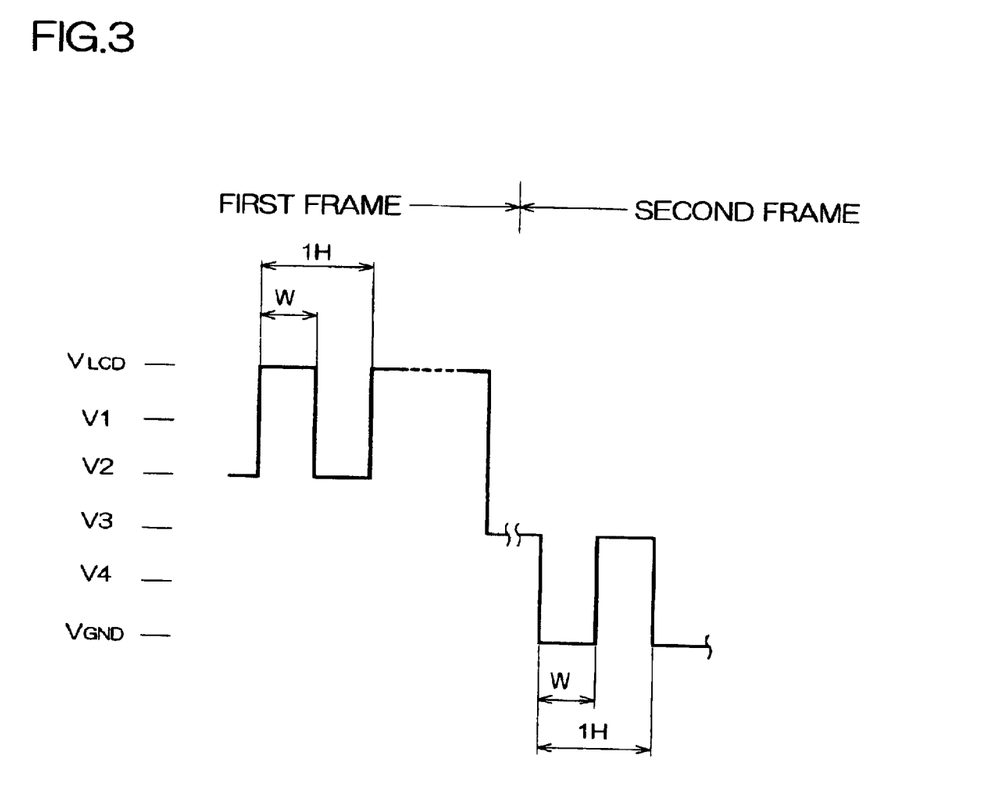
FIG. 3 is a waveform chart showing a signal potential supplied to one segment electrode by a liquid crystal driving circuit shown in FIG. 2.

FIG. 3 shows the potential of the signal supplied to one second electrode 14 from the liquid crystal driving circuit 100. FIG. 3 shows the waveform when the voltage applied to the liquid crystal is inverted in polarity every frame. "1H" shown in FIG. 3 represents one horizontal scan period. In the first frame, the gray level value is determined by the rate (duty ratio) of the pulse width W to 1H when the voltage of the pulse is equal to $V_{LCD}$. Likewise, in the second frame, the gray level value is determine by the rate (duty ratio) of the pulse width W to the period of 1H when the voltage is equal to $V_{GND}$.

In this embodiment, (1) the correction of the respective voltage values of $V_{LCD}$, V1 to V4 shown in FIG. 3, (2) the correction of the length of the 1H period shown in FIG. 3 (the correction of the frame frequency) and (3) the correction of the pulse width W (duty ratio) within 1H to each gray level value can be performed.

Voltage Correcting Circuit

The power circuit 30 shown in FIG. 2 includes a first power circuit 30A having a first temperature-voltage characteristic, a second power circuit 30B having a second temperature-voltage characteristic, and a temperature gradient selection circuit 36 for outputting the voltage conformed with a voltage characteristic having a desired temperature gradient on the basis of the output voltages from the first and second power circuits 30A, 30B.

Figure 4:
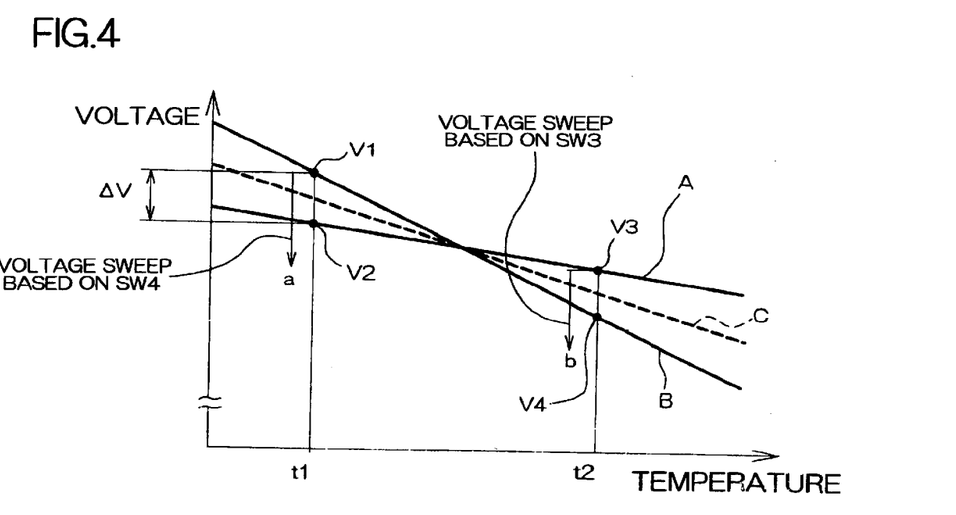
FIG. 4 is a characteristic chart showing the temperature gradient of an output voltage of a power circuit shown in FIG. 2.

The first power circuit 30A outputs a voltage A which varies in accordance with the temperature-voltage characteristic of a first temperature gradient (for example, −0.2%/° C.) shown in FIG. 4. On the other hand, the second power circuit 30B outputs a voltage B which varies in accordance with the temperature-voltage characteristic of a second temperature gradient (for example, −0.5%/° C.) shown in FIG. 4. The temperature gradient selection circuit 40 selects and outputs a voltage C having a desired temperature gradient between the voltages A and B of the first and second temperature gradients shown in FIG. 4.

The first power circuit 30A amplifies and outputs the voltage from a first constant voltage source 32A having a first temperature gradient characteristic with a desired gain by using a first amplifier 34A. A resistor R1 is connected between the output line of the first amplifier 34A and the ground. The minus terminal of the first amplifier 34A is connected to an intermediate point of the resistor R1, thereby forming a feedback resistor R1A in the feedback path of the first amplifier 34A.

The second power circuit 30B amplifies and outputs the voltage from a second constant voltage source 32B having a second temperature gradient characteristic with a desired gain by using a second amplifier 34B. A resistor R2 is connected between the output line of the second amplifier 34B and the ground. The minus terminal of the second amplifier 34B is connected to an intermediate point of the resistor R2, thereby forming a feedback resistor R2A in the feedback path of the second amnplifier 34B.

The first and second temperature gradients are determined by the process characteristics of the MOS transistors constituting the first constant voltage source 32A and the second constant voltage source 32B.

The temperature gradient selection circuit 36 comprises a resistor R3 which is connected to an intermediate point of a connection line which connects the output lines of the first and second amplifiers 34A and 34B, a switch SW1 connected to an intermediate point of the resistor R3 and a temperature gradient selection register 38 for storing connection position information of the switch SW1.

The temperature gradient selection register 38 is a programmable register, and the temperature gradient can be freely selected by the user. However, if the liquid crystal panel 10 to be used is specified, the temperature gradient inherent to the liquid crystal panel 10 is selected and no alteration is made subsequently. In this case, it is assumed that the temperature gradient selection register 38 has been already initialized and the output voltage from the power circuit 30 is conformed with the voltage characteristic C of FIG. 4.

A third amplifier 110 is provided at the rear stage of the temperature gradient selection circuit 36. A resistor R4 is connected between the output line of the third amplifier 110 and the ground. The minus terminal of the third amplifier 110 is connected to an intermediate point of the resistor R4 to form a feedback resistor RA4 in the feedback path of the third amplifier 110.

A first electric volume switch SW2 is connected to an intermediate point of the feedback resistor R4A of the third amplifier 110. Here, the resistor selected by the first electric volume switch SW2 is expressed by "resistor R4B" as shown in FIG. 2. The voltage characteristic C shown in FIG. 4 can be further corrected by making variable the value of the resistor R4B selected by the first electric volume switch SW2.

The voltage generating circuit 40 provided at the subsequent stage of the first electric volume switch SW2 includes a fourth amplifier 42 to which a voltage is input through the first electric volume switch SW2, and a resistor R5 connected between the output line thereof and the ground. The output of the fourth amplifier 42 is set as the voltage $V_{CLD}$ and it is divided into the respective voltages V1 to V4 by using the resistor R5.

In this embodiment, the voltage characteristic C shown in FIG. 4 is further corrected in accordance with the environmental temperature by controlling the first electric volume switch SW2 in accordance with the environmental temperature.

Therefore, this embodiment is equipped with a temperature detector 120 for detecting the environmental temperature by utilizing two kinds of temperature gradient characteristics shown in FIG. 4. As shown in FIG. 2, the temperature detector 120 includes a frequency dividing circuit 122 for frequency-dividing the oscillation output of the oscillating circuit 60, a counter 124 which counts the clocks from the frequency-dividing circuit 122 and is reset every time it counts a predetermined count value, a first temperature detecting switch SW3 connected to the feedback resistor R1A which is connected to the first amplifier 34A in the first power circuit 30A, a temperature detecting switch SW4 connected to the feedback resistor R2A which is connected to the second amplifier 34B in the second power circuit 30B, a comparator 126 for comparing the voltages input through the first and second temperature detecting switches SW3, SW4, and a temperature setting register 128 for outputting the data corresponding to the actual temperature on the basis of the counter 124 when the comparator 126 is varied.

Here, one of the temperature detecting switches SW3 and SW4 successively switches its contact from one end of the feedback register R2A, R3A to the other end every time the output of the counter 122 varies. For example, if the switch SW3 is fixed to the position shown in FIG. 2 and the switch SW4 is switched, the voltage input through the temperature detecting switch SW4 to the comparator 126 is swept in the direction indicated by an arrow a of FIG. 4. That is, when any temperature t1 is detected in FIG. 4, the voltage input through the temperature detecting switch SW4 to the comparator 126 is swept from the voltage V1 on the voltage characteristic B. The voltage thus swept is lower than the voltage V2 (the voltage input through the temperature detecting switch SW3 to the comparator 126) on the voltage characteristic A at some time point, and the output of the comparator 126 varies from "H" to "L". Representing the voltage variation amount at this time by $\Delta V$, the variation amount $\Delta V$ is a value inherent to the temperature t1. Accordingly, the temperature setting register 128 can output the actual temperature t1 on the basis of the count value of the counter 122 (corresponding to the voltage variation amount $\Delta V$) when the output of the comparator 126 varies.

In order to detect the actual temperature t2, it is sufficient that the switch SW4 is fixed and the switch SW3 is switched to sweep the voltage input to the comparator 126 through the temperature detecting switch SW3 in the direction indicated by an arrow b as shown in FIG. 4. With this operation, the voltage swept from V3 is lower than the voltage V4 at some time point, and the output of the comparator 126 varies from "L" to "H", for example. As a result, the actual temperature t2 can be detected in the same manner as described above. The output line of the counter 124 shown in FIG. 2 is also connected to the temperature detecting switch SW3. However, it is omitted from the illustration of FIG. 2.

If the input line to the minus terminal of the comparator 126 is fixedly connected to an intermediate point of the resistor R1 without passing through the switch SW3, and if the contact of the switch SW4 is shifted from the ground side of the resistor R2 to the output line side of the amplifier 34B. Then the actual temperature t1 or t2 can be detected.

As described above, the temperature detector 120 can be detected the actual temperature by utilizing the temperature gradient characteristic of the power circuit 30 itself. The constant voltage sources 30A, 30B having the two kinds of temperature gradients are provided to the power circuit 30, and the applied voltage to the liquid crystal is corrected on the basis of the actual temperature detected by using the two kinds of temperature gradients, so that the accurate correction can be performed.

Next, the mechanism of controlling the first electric volume switch SW2 on the basis of the actual temperature detected will be described. As shown in FIG. 2, a first electric volume switch controller 130 includes a first correction table 132 formed of ROM, PROM or the like in which correction values are set according to the request of a liquid crystal panel maker, a first register 134 for storing control reference values of the first electric volume switch SW2 which are set according to the request of a liquid crystal panel maker, and a first adder 136 for adding the digital values of both the correction values and the control reference values and outputting the addition result.

Figure 5:
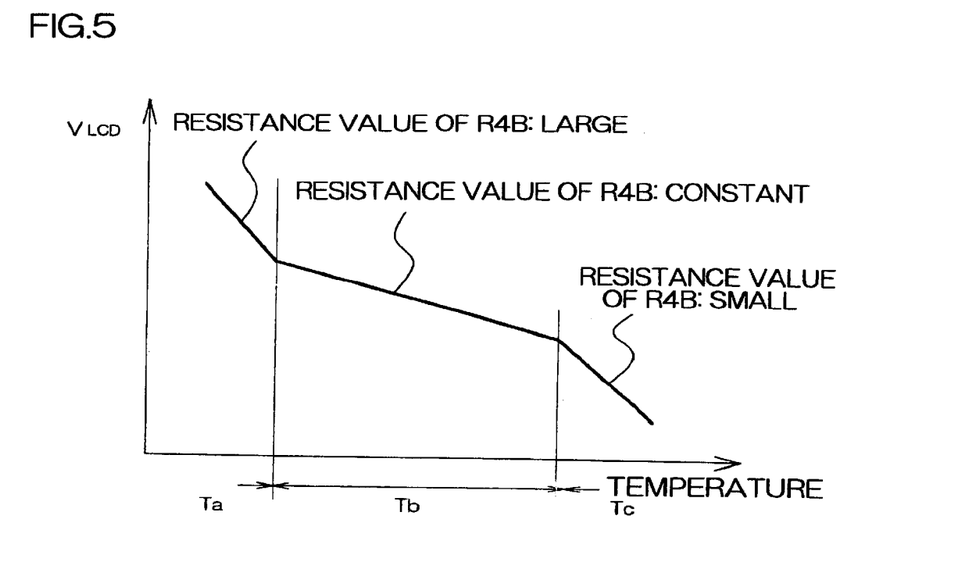
FIG. 5 is a characteristic chart showing the temperature dependence of a liquid crystal applied voltage $V_{LCD}$ obtained by adjusting a first electric volume switch shown in FIG. 2.

FIG. 5 shows the temperature dependence of the liquid crystal applied voltage $V_{CLD}$ obtained on the basis of the output of the first electric volume switch SW2 controlled by a first electric volume switch controller 130. More specifically, FIG. 5 shows the temperature dependence in which the liquid crystal voltage $V_{CLD}$ has a temperature gradient which is different among a low temperature area Ta, an intermediate temperature area Tb and a high temperature area Tc. Therefore, the intermediate temperature area Tb is principally determined by the temperature gradient selection switch SW1 based on the output from the temperature gradient selection register 38 and the first electric volume switch SW2 based on the output from the first register 134. The low temperature area Ta and the high temperature area Tc are set by the first electric volume switch SW2 controlled on the basis of the output from the first correction table 132. In the low temperature area Ta, the resistance value of the resistor R4B selected by the first electric volume switch SW2 is set to a smaller value (the contact of the switch SW2 is approached more closely to the output side of the third amplifier 110) as the temperature is reduced. On the other hand, in the high temperature area Tc, the resistance value of the resistor R4B is set to a larger value (the contact of the switch SW2 is approached more closely to the GND side) as the temperature is increased.

Accordingly, the liquid crystal applied voltages $V_{CLD}$, V1 to V4 having the temperature dependence inherent to the liquid crystal panel 10 can be generated from the output voltage of the power circuit 30 having the two kinds of temperature gradient characteristics.

The temperature dependence characteristic shown in FIG. 5 is determined by the linear interpolation so that the gradient thereof is different among three sectional areas, however, other various modifications may be made to the number of sectional areas (dividing number) and the interpolation manner. For example, a curved (non-linear) interpolation may be applied.

Frame Frequency Correcting Circuit

A CR oscillating circuit 60 having a capacitor C and a resistor R6 is made variable in oscillation frequency (frame frequency) by making variable the resistance value of the resistor R6 connected to the oscillation circuit 60 by the second electric volume switch SW5. A variable capacitance type may be used as the oscillation circuit 60.

As shown in FIG. 2, there is provided a second electric volume switch controller 140 for controlling the second electric volume switch SW5 on the basis of the actual temperature detected by the temperature detector 120. The second electric volume switch SW5 has a second correction table 142 formed of ROM or the like in which correction values are set according to the request of a liquid crystal panel maker, a second register 144 for storing the control reference value of the second electric volume switch SW5 set according to the request of the liquid crystal panel maker, and a second adder 146 for adding the digital values of both the correction value and the control reference value and outputting the addition result.

Figure 6:
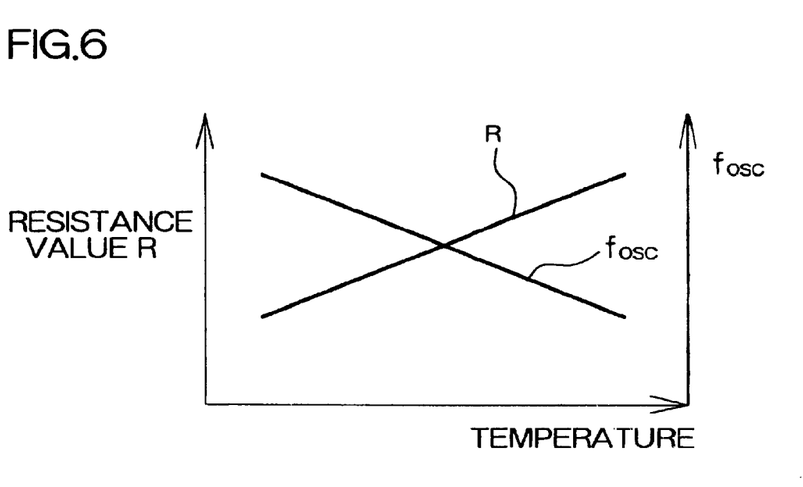
FIG. 6 is a characteristic chart showing the temperature dependence of an oscillation frequency.

As described above, the reason why the oscillation frequency is varied in accordance with the temperature is as follows. As shown in FIG. 6, the inherent oscillation frequency of the oscillation circuit 60 has a temperature dependence characteristic in which it is lowered as the temperature is increased. This is because the resistance value of the resistor (diffused resistor) R6 in the oscillation circuit 60 is increased as the temperature is increased as shown in FIG. 6 and the inherent oscillation frequency is in inversely proportional relationship with the resistance value. On the other hand, the motion of liquid crystal molecules is more quick as the temperature is increased, and the liquid crystal molecules respond before a next writing operation is carried out, resulting in degradation of image quality. Accordingly, the frame frequency is preferably high in the high temperature area, however, the inherent oscillation frequency from the oscillation circuit 60 is rather lowered.

Figure 7:
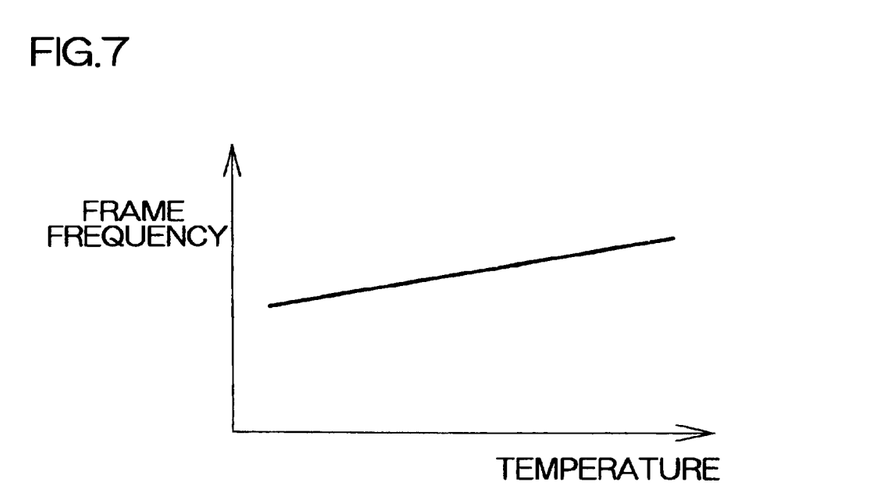
FIG. 7 is a characteristic chart showing the temperature dependence of a frame frequency obtained by adjusting a second electric volume switch.

Therefore, according to this embodiment, the inherent oscillation frequency shown in FIG. 6 is improved to obtain the higher frame frequency as the temperature is increased as shown in FIG. 7. In order to achieve this, the second electric volume switch SW5 is controlled so that the resistance value of the resistor R6 connected to the oscillation circuit 60 is high in the low temperature area and low in the high temperature area.

Through this control, in the high temperature area, the frame frequency can be set to a higher frame frequency which is matched with the liquid crystal whose reaction velocity is higher as the temperature is increased. Conversely, in the low temperature area, the frame frequency can be set to a lower frame frequency because the reaction velocity of the liquid crystal is lower as the temperature is lowered.

Gray scale pulse Width Correcting Circuit

A gray scale pulse width correcting circuit 150 shown in FIG. 2 includes a third correction table 152 formed of ROM or the like in which the correction values for a gray scale pulse width are set according to the request of the liquid crystal panel maker, a third register 154 for storing gray scale pulse width information which is set according to the request of the liquid crystal panel maker and particularly used to set the intermediate gray level contrast in conformity with the liquid crystal panel 10, and a third adder 156 for adding the digital values of both the correction value for a gray scale pulse width and the gray scale pulse width information and outputting the addition result.

Figure 8:
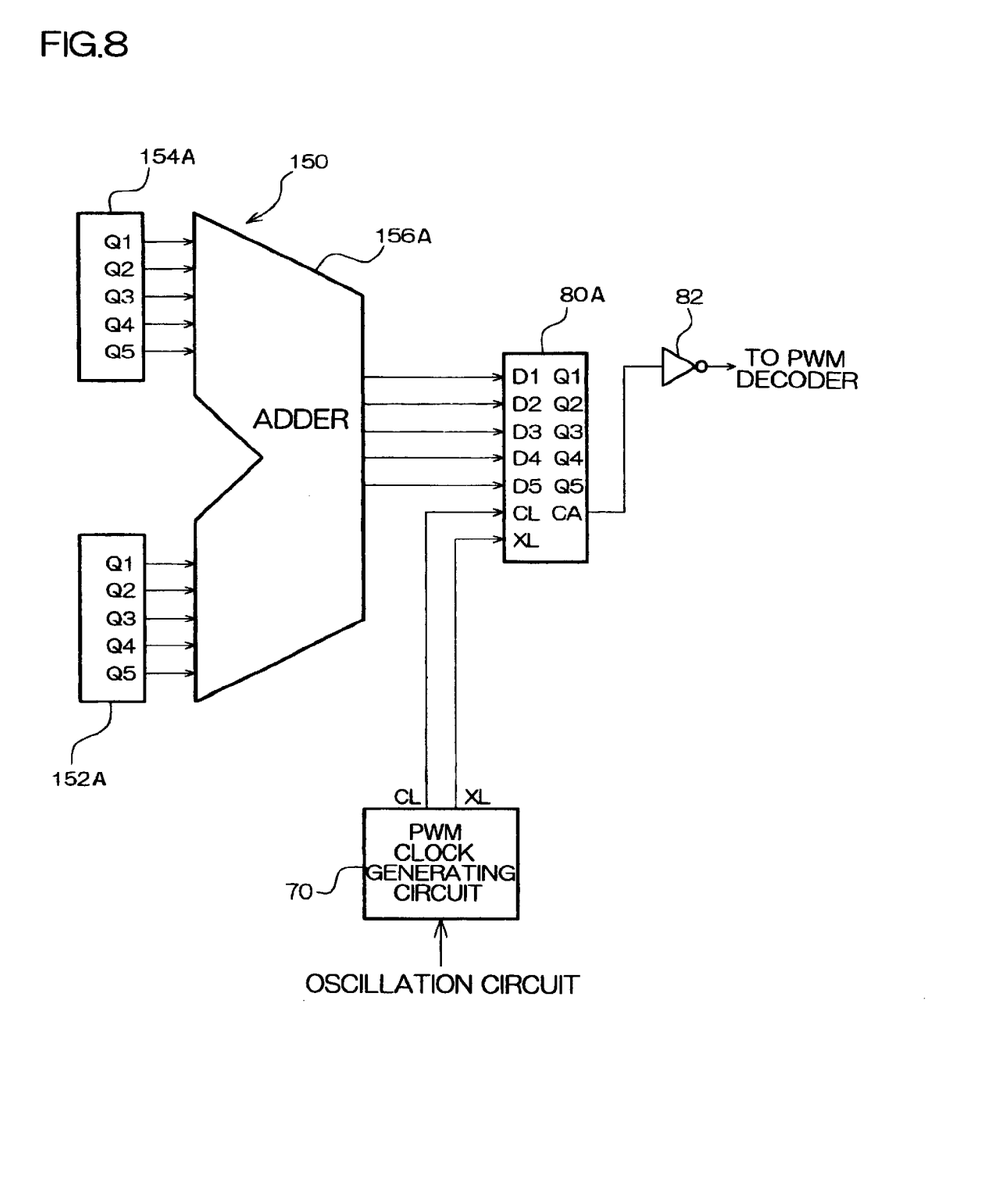
FIG. 8 is a block diagram showing a gray scale pulse width correcting circuit, a PWM clock generating circuit and a gray scale pulse generating circuit shown in FIG. 2.

FIG. 8 shows the construction for generating the gray scale pulse corresponding to some gray level value. In FIG. 8, a correction table 152A, a register 154A, an adder 156A and a counter 80A are parts of the third correction table 152, the third register 154, the third adder 156 and the gray scale pulse generator 80, respectively. In the case of $2^2=4$ gray scales, four sets of fabrications excluding a PWM clock generating circuit 70 shown in FIG. 8 are provided. The operation of the circuit shown in FIG. 8 is shown in the timing chart of FIG. 9.

In FIG. 8, the adder 156A adds the digital values of respective 5 bits from the correction table 152A and the register 154A. In the counter 80A, the data from the adder 156A are loaded and the clock CL is counted up by only the amount corresponding to the data value thus loaded, whereby carry CA is varied from "L" to "H".

Figure 9:
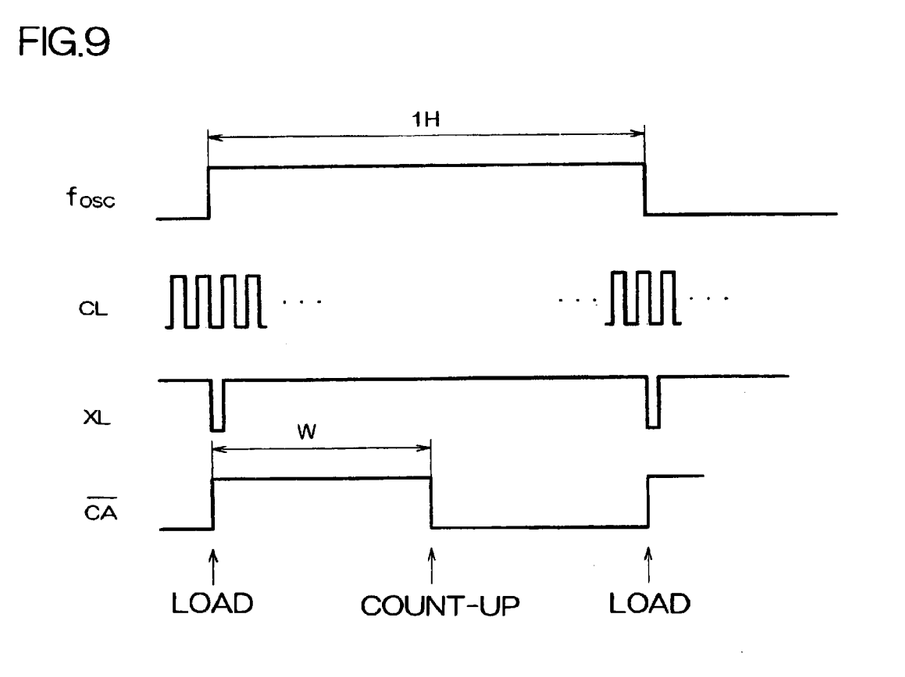
FIG. 9 is an operation timing chart of the circuits shown in FIG. 8.

Here, as shown in FIG. 9, the PWM clock generating circuit 70 subjects the frame frequency from the oscillating circuit 60 to 32 frequency division to generate 32 clocks CL within 1H, and these clocks CL are input to the counter 80A. The PWM clock generating circuit 70 further generate a signal XL to reset the counter 80A every horizontal scan period 1H.

Accordingly, the output of an inverter 82 connected to the carry terminal CA of the counter 80A is kept to "H" until the counter 80A counts up the value loaded from the adder 156A as shown in FIG. 9, and it is varied to "L" after the count-up. This is used as a gray scale pulse having a pulse width W. As described above, the gray scale pulse is generated based on the correction value in the third correction table 152. In the case of this embodiment, the gray scale pulse can be selected from $2^5=32$ gray scales by using 5-bit data.

Figure 10:
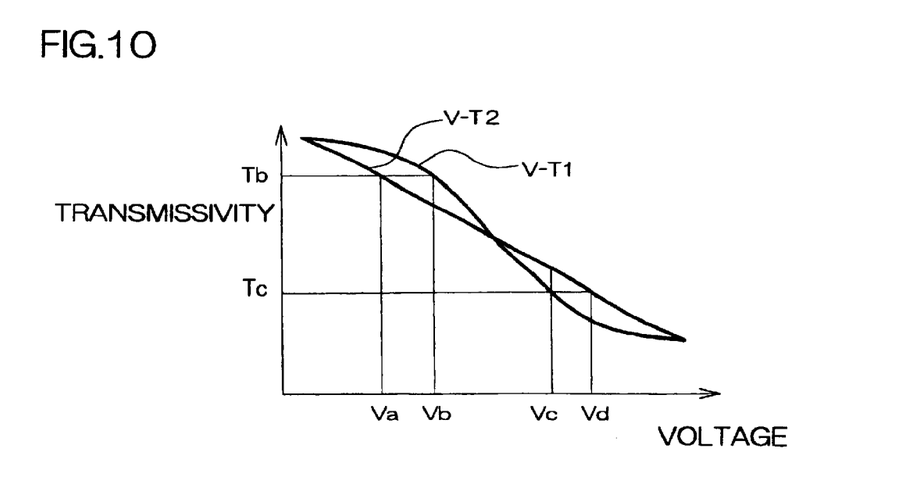
FIG. 10 is a characteristic chart showing the applied voltage-transmissivity characteristic of liquid crystal at a room temperature and at a lower temperature.

Next, correction for the gray scale pulse width will be described. FIG. 10 shows the difference in applied voltage-transmissivity characteristic of liquid crystal between the room temperature and the low temperature. In FIG. 10, the characteristic V-T1 shows the characteristic at the room temperature, and the characteristic V-T2 shows the characteristic at the low temperature.

Here, the voltages Va to Vd indicated on the abscissa of FIG. 10 represent the voltages applied to the liquid crystal with which the values of transmissivity Ta to Td are obtained at the room temperature, respectively. However, when the temperature is lowered, the transmissivity obtained is lower than the transmissivity Tb at the room temperature even if the voltage Vb is applied to the liquid crystal. If the voltage Vc is applied to the liquid crystal at the low temperatures, the transmissivity is higher than the transmissivity Tc at the room temperature. Therefore, as apparent from FIG. 10, it is better that in place of the voltage Vb, the voltage Va lower than the voltage Vb is applied to the liquid crystal in order to obtain the transmissivity Tb at the low temperatures while in place of the voltage Vc, the voltage Vd higher than the voltage Vc is applied to the liquid crystal in order to obtain the transmissivity Tc at the lower temperatures.

Figure 11A:
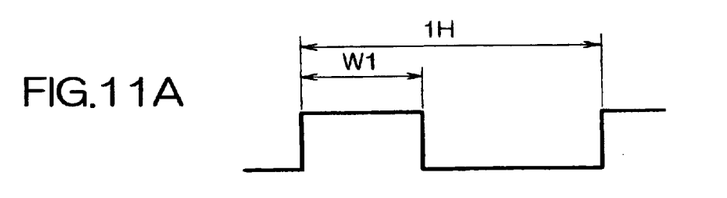
FIGS. 11A to 11D are waveform charts showing the gray scale pulses having different pulse widths and used to obtain the same transmissivity both at a room temperature and at a lower temperature.
Figure 11B:
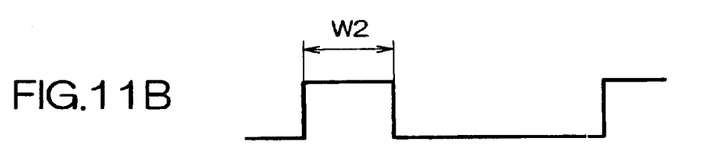
Figure 11C:
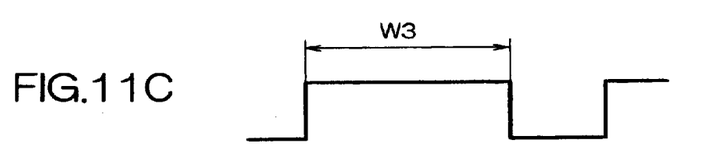
Figure 11D:
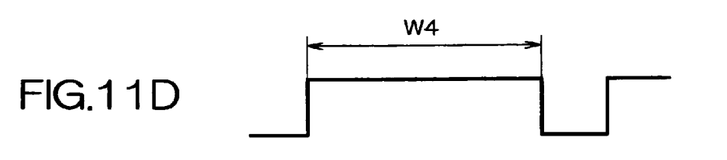

As described above, in the case of the PWM (pulse width modulation) driving system, in order to obtain the transmissivity Tb at the room temperature, a gray scale pulse having a pulse width W1 as shown in FIG. 11A may be used. However, in order to obtain the same transmissivity Tb at the low temperatures, a gray scale pulse having a pulse width W2 (W2<W1) as shown in FIG. 11B must be used. Likewise, in order to obtain the transmissivity Tc at the room temperature, a gray scale pulse having a pulse width W3 as shown in FIG. 11C may be used. However, in order to obtain the same transmissivity Tc at the low temperatures, a gray scale pulse having a pulse width W4 (W4>W3) as shown in FIG. 11D must be used.

As described above, by storing correction values for the gray scale pulse width in the third table 152 and reading out a stored correction value corresponding to an actual temperature detected by the temperature detector 120, the compensation for the applied voltage-transmissivity characteristic of liquid crystal depending on the temperature can be implemented. In order to correct the broader pulse width W1 to the narrower pulse width W2, it may be sufficient that a negative digital value is stored in the third correction table 152 in advance and it is subtracted in the third adder 156.

Structure for Detecting Temperature

All of the three temperature compensation countermeasures described above are used to compensate for the temperature dependence on the liquid crystal, and thus it is the most accurate temperature compensation countermeasure to detect the temperature of the liquid crystal itself.

Here, the temperature detector 120 of this embodiment carries out the temperature detection by using the two kinds of temperature gradients of the power circuit 30 mounted in the X driver IC 22 shown in FIG. 1. Accordingly, a physical distance exists between the X driver IC 22 containing the temperature detector 120 and the liquid crystal panel 10 in which liquid crystal exists.

Figure 12:
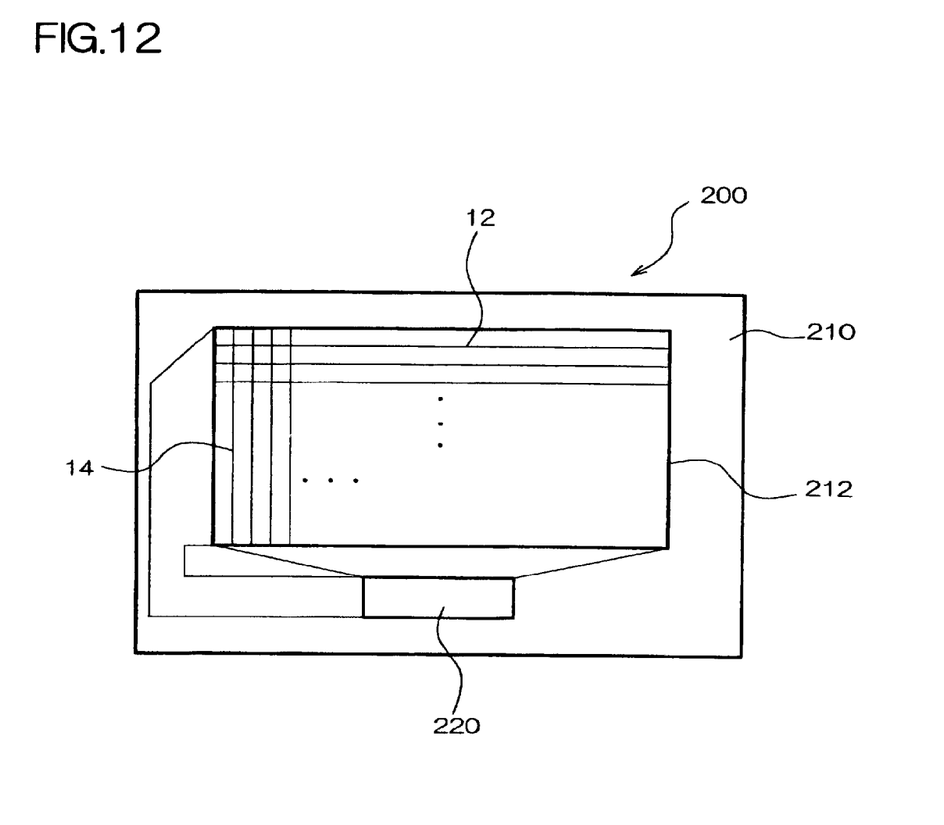
FIG. 12 is a plan view showing a liquid crystal unit having a driver IC mounted on a glass substrate by COG.
Figure 13:
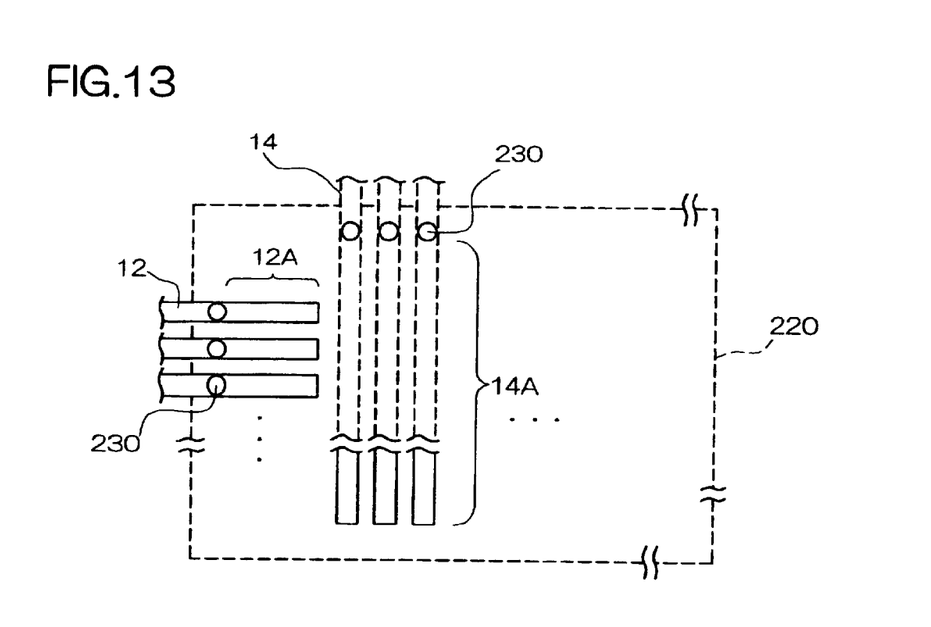
FIG. 13 is an enlarged plan view showing an area which is a part of the glass substrate shown in FIG. 12 and on which the driver IC is mounted.

Therefore, the structure shown in FIGS. 12 and 13 is preferably adopted. FIG. 12 is a plan view showing a liquid crystal unit 200 in which a driver IC 200 is mounted on one first glass substrate 210 which constitutes the liquid crystal panel 10 by COG (Chip On Glass). The liquid crystal unit 200 comprises a first glass substrate 210 on which the first electrodes 12 are formed, a second glass substrate 212 on which second electrodes 14 are formed, and liquid crystal which is hermetically filled in the gap between the first and second glass substrates 210 and 212. The driver IC 220 shown in FIG. 12 has the functions of the two X driver ICs 22, 24 and the Y driver IC 26 shown in FIG. 1. Accordingly, the driver IC 220 contains the power circuit 30, the temperature detector 120 shown in FIG. 2 and the temperature compensation circuit indicated by the respective blocks of 130, 140 and 150 in FIG. 2.

FIG. 13 shows a part of the first glass substrate 210 and is an enlarged view showing an area in which the driver IC 220 is arranged. The first and second electrodes 12, 14 (normally transparent electrodes) are formed on the first and second glass substrates 210, 212 so as to extend into the area (the square area indicated by a broken line) in which the driver IC 220 is arranged. The second electrodes 14 formed on the second glass substrate 212 are conducted to the second electrodes 14 formed on the first glass substrate 210 through the conductive portion.

Figure 14:
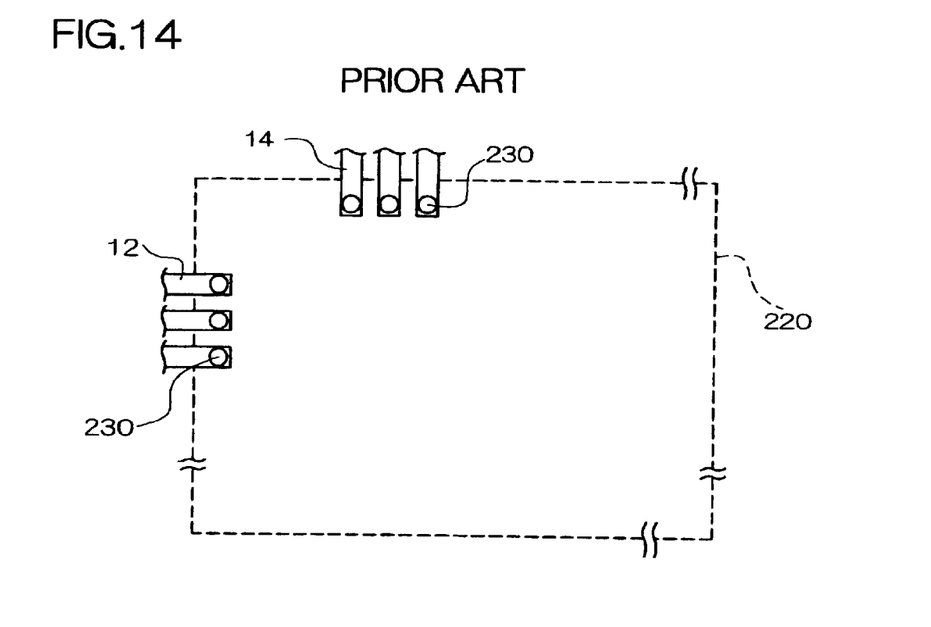
FIG. 14 is an enlarged plan view of a prior art which shows an area corresponding to that of FIG. 13.

Here, the first, second electrodes 12, 14 and the driver IC 220 are connected to each other through bumps 230 show in FIG. 12. In the prior art, the first, second electrodes are normally formed so as to extend to the bumps 230 as shown in FIG. 14.

However, according to this embodiment, the first, second electrodes 12, 14 are formed so as to have redundant portions 12A, 14A which go beyond the bumps 230 and extend deeply into the mount area of the driver IC 220 as shown in FIG. 13. More preferably, at least one of the redundant portions 12A, 14A of the first, second electrodes 12, 14 extends to the position at which it faces the power circuit 30 mounted in the driver IC 220.

With this structure, the temperature of the liquid crystal filled in the gap between the first and second glass substrates 210 and 212 is transmitted through the first, second electrodes 12, 14 and the redundant portions 12A, 14A thereof to the driver IC 220. Therefore, the temperature detector 120 installed in the driver IC 220 can detect the temperature which is substantially equal to the temperature of the liquid crystal. Accordingly, by adopting this structure, the three kinds of temperature compensation methods as described above can be performed with higher precision.

When the redundant portions of the electrodes shown in FIG. 13 are formed, the redundant portions may be formed for only a driver IC having a temperature sensor if the driver IC is divided into X and Y drivers IC as shown in FIG. 1. Accordingly, in the case of FIG. 1, the redundant portions 14A of the second electrodes 14 may be formed on the back surface of the X driver IC 22 in which the temperature detector 120 is installed.

The structure of FIG. 13 may be applied to liquid crystal devices other than the simple matrix type liquid crystal device. For example, in the case of an active matrix type liquid crystal device using TFT, MIM or the like as an active element, the redundant portions may be formed in at least one group of signal electrodes connected through TFT or MIM to pixel electrodes facing the liquid crystal (formed at the matrix substrate side) and common electrodes facing the pixel electrodes (formed at the counter substrate side).

The present invention is not limited to the above-described embodiments, and various modifications may be made without departing from the subject matter of the present invention. For example, as the electronic equipment to which the present invention is applied may be used not only a cellular phone, but also a device in which a display unit using an electro-optical element such as liquid crystal or the like is mounted, for example, a personal computer, mobile equipment, a camera with a view finder, a pager, POS terminal, an electronic pocketbook, a navigation apparatus, or the like.

What is claimed is:

1. A driver IC for driving an electro-optical element comprising:

a power circuit for outputting a voltage in accordance with temperature-voltage characteristics;

an electrical volume for varying an output voltage from the power circuit;

a temperature detector for detecting an environmental temperature based on the temperature-voltage characteristics of the power circuit; and a correction memory for storing an electrical volume control value corresponding to the temperature detected by the temperature detector, wherein the power circuit comprises:

a first power circuit having a first temperature-voltage characteristic;

a second power circuit having a second temperature-voltage characteristic; and a temperature gradient selection circuit for outputting a voltage conforming with a desired temperature gradient characteristic based on output voltages from the first and second power circuits, wherein the temperature detector is installed in the driver IC to detect temperature based on the first and second temperature-voltage characteristics without directly measuring the environmental temperature, and adjusts the output voltages from the first and second power circuits at the electrical volume according to the electrical volume control value in the correction memory and outputs adjusted output voltages, the electrical volume control value corresponding to the temperature detected by the temperature detector.

2. The driver IC as defined in claim 1, wherein the first power circuit includes a first constant voltage source, and a first amplifier for amplifying and outputting an output voltage from the first constant voltage source based on a resistance value of a first feedback resistor;

wherein the second power circuit includes a second constant voltage source, and a second amplifier for amplifying and outputting an output voltage from the second constant voltage source based on a resistance value of a second feedback resistor; and wherein the first and second temperature-voltage characteristics depend on the characteristics of elements constituting the first and second constant voltage sources.

3. The driver IC as defined in claim 2, wherein the temperature detector further comprises:

a first temperature detecting switch connected to the first feedback resistor;

a second temperature detecting switch connected to the second feedback resistor; and a comparator for comparing voltages which are input through the first and second temperature detecting switches while shifting a contact of one of the first and second temperature detecting switches between a first reference position and a second reference position, wherein the temperature is detected based on an output from the comparator for the contact shifting between the first and second reference positions.

4. The driver IC as defined in claim 2, wherein the temperature gradient selection circuit comprises:

a resistor connected to an intermediate point of a connection line which connects output lines of the first and second amplifiers; and a switch connected to the resistor.

5. The driver IC as defined in claim 4, wherein the temperature gradient selection circuit is capable of varying a temperature gradient by shifting a contact at which the switch is connected to the resistor.

6. The driver IC as defined in claim 4, further comprising a third amplifier for amplifying an output from the switch based on a resistance value of a third feedback resistor, wherein the electric volume is capable of shifting a contact to be connected to the third feedback resistor.

7. An electro-optical device comprising:

the driver IC as defined in claim 1; and a panel having an electro-optical element driven by the driver IC.

8. Electronic equipment comprising the electro-optical device as defined in claim 7.

9. A driver IC for driving an electro-optical element comprising:

a power circuit for outputting a voltage in accordance with temperature-voltage characteristics;

an oscillator for outputting an oscillation frequency which is variable by an electrical volume;

a temperature detector for detecting an environmental temperature based on the temperature-voltage characteristics of the power circuit; and a correction memory for storing an electric volume control value corresponding to the temperature detected by the temperature detector, wherein the oscillation frequency of the oscillator is variable by adjusting the electrical volume based on the electrical volume control value in the correction memory which corresponds to temperature detected by the temperature detector, wherein the temperature detector is installed in the driver IC to detect the temperature without directly measuring the environmental temperature.

10. The driver IC as defined in claim 9, further including a power circuit, wherein the power circuit comprises:

a first power circuit having a first temperature-voltage characteristic; and a second power circuit having a second temperature-voltage characteristic, wherein the temperature detector detects the temperature based on the first and second temperature-voltage characteristics.

11. The driver IC as defined in claim 10, wherein the first power circuit includes a first constant voltage source, and a first amplifier for amplifying and outputting an output voltage from the first constant voltage source based on a resistance value of a first feedback resistor;

wherein the second power circuit comprises a second constant voltage source, and a second amplifier for amplifying and outputting an output voltage from the second constant voltage based on a resistance value of a second feedback resistor; and wherein the first and second temperature-voltage characteristics depend on the characteristics of elements constituting the first and second constant voltage sources.

12. The driver IC as defined in claim 11, wherein the temperature detector comprises:

a first temperature detecting switch connected to the first feedback resistor;

a second temperature detecting switch connected to the second feedback resistor; and a comparator for comparing voltages which are input through the first and second temperature detecting switches while shifting a contact of one of the first and second temperature detecting switches between a first reference position and a second reference position, wherein the temperature is detected based on an output from the comparator.

13. The driver IC as defined in claim 9, wherein the electric volume increase a value of an oscillation frequency of the oscillator when the temperature detected by the temperature detector is high, and lowers the value of the oscillation frequency of the oscillator when the temperature is low.

14. An electro-optical device comprising:

the driver IC as defined in claim 9; and a panel having an electro-optical element driven by the driver IC.

15. Electronic equipment comprising the electro-optical device as defined in claim 14.

16. A driver IC for driving an electro-optical element, comprising:

a power circuit for outputting a voltage in accordance with temperature-voltage characteristics;

an oscillator;

a gray scale clock generator for generating a gray scale clock based on an oscillation frequency of the oscillator;

a gray scale pulse generator for generating a plurality of gray scale pulses each having a pulse width which depends on a gray level value, based on the gray scale clock from the gray scale clock generator;

a temperature detector for detecting an environmental temperature based on the temperature-voltage characteristics of the power circuit; and a correction memory for storing a correction value for a gray scale pulse width which corresponds to the temperature detected by the temperature detector, wherein the gray scale pulse generator is capable of varying pulse widths of a plurality of gray scale pulses based on a correction value for a gray scale pulse width in the correction memory which corresponds to the temperature detected by the temperature detector, wherein the temperature detector is installed in the driver IC to detect the temperature without directly measuring the environmental temperature.

17. The driver IC as defined in claim 16, further comprising a power circuit, wherein the power circuit comprises:

a first power circuit having a first temperature-voltage characteristic; and a second power circuit having a second temperature-voltage characteristic, wherein the temperature detector detects the temperature based on the first and second temperature-voltage characteristics.

18. The driver IC as defined in claim 17, wherein the first power circuit includes a first constant voltage source, and a first amplifier for amplifying and outputting an output voltage from the first constant voltage source based on a resistance value of a first feedback resistor;

wherein the second power circuit includes a second constant voltage source, and a second amplifier for amplifying and outputting an output voltage from the second constant voltage source based on a resistance value of a second feedback resistor; and wherein the first and second temperature-voltage characteristics depend on the characteristics of elements constituting the first and second constant voltage sources.

19. The driver IC as defined in claim 18, wherein the temperature detector comprises:

a first temperature detecting switch connected to the first feedback resistor;

a second temperature detecting switch connected to the second feedback resistor; and a comparator for comparing voltages which are input through the first and second temperature detecting switches while shifting a position of a contact of one of the first and second temperature detecting switches between a first reference position and a second reference position, wherein the temperature is detected based on an output from the comparator.

20. An electro-optical device comprising:

the driver IC as defined in claim 16; and a panel having an electro-optical element driven by the driver IC.

21. Electronic equipment comprising the electro-optical device as defined in claim 20.

22. An electro-optical device comprising:

a panel having an electro-optical element between a first substrate and a second substrate; and a driver IC which is mounted on the first substrate and drives the electro-optical element, wherein the driver IC comprises:

a power circuit for outputting a voltage in accordance with temperature-voltage characteristics;

a temperature detector for detecting an environmental temperature based on the temperature-voltage characteristics of the power circuit; and a temperature compensation circuit for performing temperature compensation necessary for driving the electro-optical element, based on the temperature detected by the temperature detector, wherein first and second electrodes are respectively formed on the first and second substrates to face the electro-optical element; and wherein at least one of the first and second electrodes is connected to a terminal of the driver IC mounted on the first substrate and has a redundant portion which extends from a position of the terminal to a back surface of the driver IC, wherein the temperature detector is installed in the driver IC to detect the environmental temperature without directly measuring the environmental temperature.

23. Electronic equipment comprising the electro-optical device as defined in claim 22.

24. The electro-optical device as defined in claim 22, further comprising a power circuit, wherein the power circuit comprises:

a first power circuit having a first temperature-voltage characteristic; and a second power circuit having a second temperature-voltage characteristic;

wherein the temperature detector detects the temperature detected based on the first and second temperature-voltage characteristics.

* * * * *